O. EBERT.
HOLLOW MILL.
APPLICATION FILED AUG. 9, 1915.

1,165,859.

Patented Dec. 28, 1915.
2 SHEETS—SHEET 1.

Witness
A. P. Smith

Inventor
Otto Ebert
By John A. Bommhardt
Attorney

O. EBERT.
HOLLOW MILL.
APPLICATION FILED AUG. 9, 1915.

1,165,859.

Patented Dec. 28, 1915.
2 SHEETS—SHEET 2.

Witness
A. Smith

Inventor
Otto Ebert
By John A. Bommhardt
Attorney

UNITED STATES PATENT OFFICE.

OTTO EBERT, OF CLEVELAND, OHIO.

HOLLOW MILL.

1,165,859.  Specification of Letters Patent.  Patented Dec. 28, 1915.

Application filed August 9, 1915. Serial No. 44,526.

*To all whom it may concern:*

Be it known that I, OTTO EBERT, citizen of the United States, residing at Cleveland, in the county of Cuyahoga and State of Ohio, have invented certain new and useful Improvements in Hollow Mills, of which the following is a specification.

This invention relates to hollow mills for turning or milling, and has for its object to provide improved means for supporting the cutters in proper position to sustain the strains and thrust thereon, and for adjusting the same to proper position.

The invention is illustrated in the accompanying drawings in which—

Figure 1:
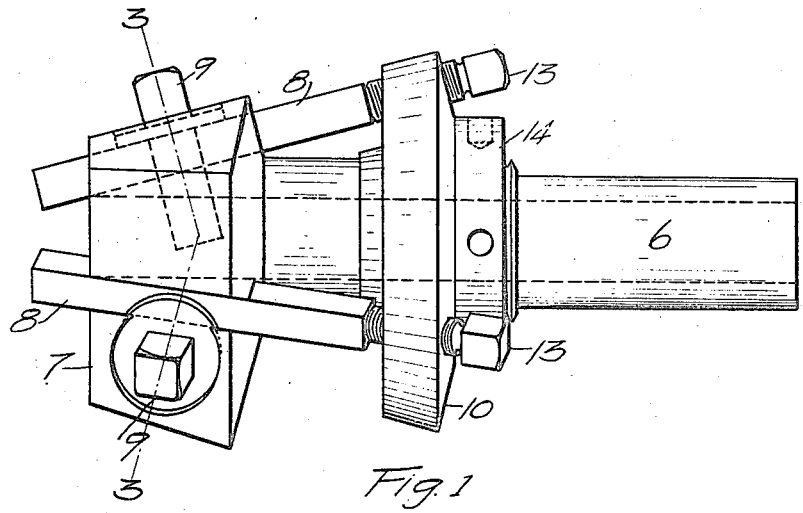
Figure 2:
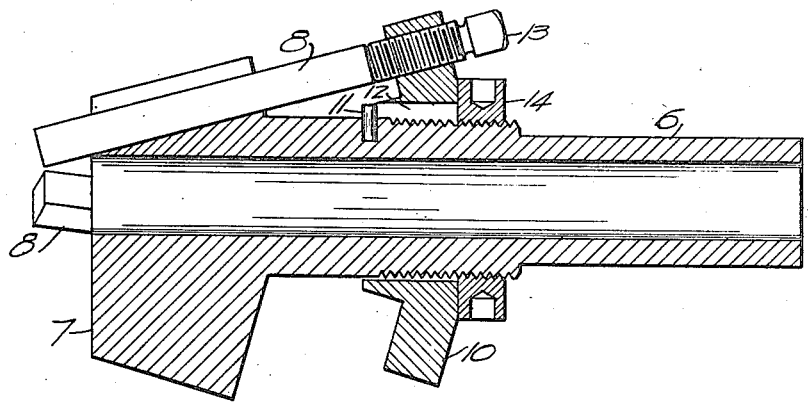
Figure 3:
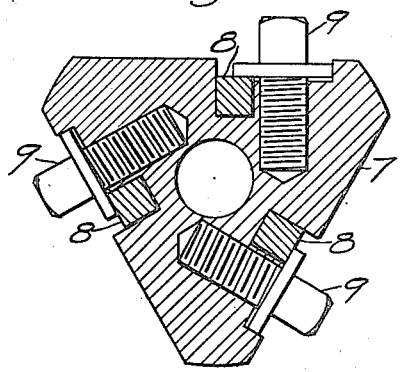
Figure 5:
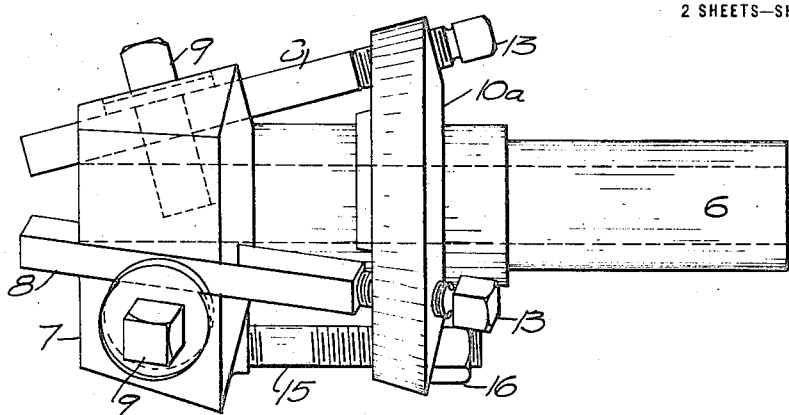
Figure 6:
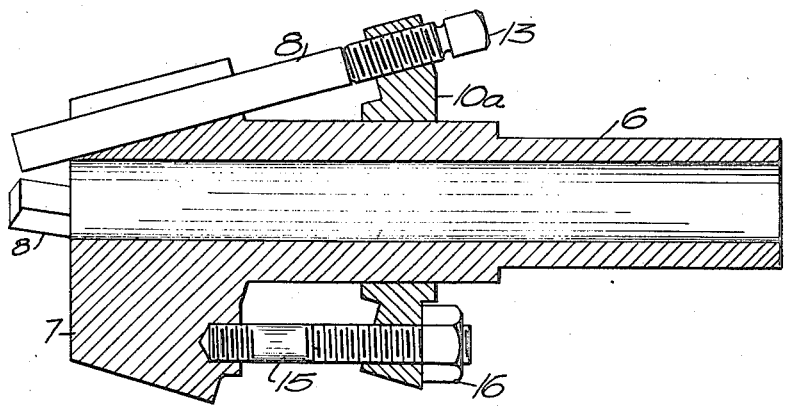
Figure 4:
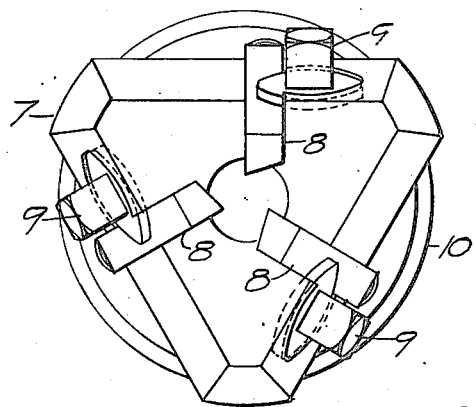

Figure 1 is a side elevation of the tool. Fig. 2 is a longitudinal section. Fig. 3 is a section on the line 3—3 of Fig. 1. Fig. 4 is a front end view. Fig. 5 is a side elevation of a modification. Fig. 6 is a longitudinal section of Fig. 5.

Referring specifically to the drawings, 6 indicates a hollow shank provided at its front end with a triangular head 7 having, as shown, three longitudinal inclined grooves in which the cutters 8 are clamped, and project at their front ends beyond the front end of the head, where they are clamped by screws 9 tapped into the head perpendicular to the grooves. Behind the head the shank receives a loose collar 10 which has a projecting annular flange, and is prevented from rotating by a pin 11 engaging in a groove 12 in the collar, but the collar can move lengthwise on the shank. The flange of the collar is tapped through at an angle in line with each cutter, to receive adjusting screws 13 the front ends of which bear against the rear ends of the cutters 8, and on a threaded part of the shank, behind the collar 10 is a ring nut 14 by which the collar may be adjusted and set up with the screws 13 against the cutters. The adjustment of the cutters is effected by screwing up the nut 14 and advancing the collar to proper position, and then setting in the screws 13 against the individual cutters, after which the latter are clamped by the screws 9, the several parts thereof holding the cutters against lateral or longitudinal movement.

In the modified form shown in Figs. 5 and 6, the collar 10, instead of being held by the ring nut 14, is held in position on the shank by a screw 15, fixed in the head and extending parallel, and through an opening in the collar 10ª, with a nut 16 on the screw behind the collar, by adjustment of which nut the collar can be set and held in proper position. It will be noted that in both constructions the collar acts against all the cutters to adjust or sustain the same. The cutting ends of the tool act in the usual way on work introduced between the same, the adjustment permitting operation on work of various diameters.

What I claim as new is:

A hollow mill comprising a shank and grooved head, cutters clamped in the grooves, a non-rotatable flanged collar adjustable axially on the shank behind the cutters, screws extending through the flange of the collar and bearing at their front ends against the rear ends of the cutters, and exposed at their rear ends for manipulation, and means to hold the collar in adjusted position.

In testimony whereof, I affix my signature in presence of two witnesses.

OTTO EBERT.

Witnesses:
JOHN A. BOMMHARDT,
J. B. DAVIS.